United States Patent [19]

McCarthy et al.

[11] 3,989,238

[45] Nov. 2, 1976

[54] PHOTOCOPY MACHINE

[75] Inventors: James George McCarthy, Park Ridge; Burton Greenberg, Skokie, both of Ill.

[73] Assignee: OCE'-Industries Inc., Chicago, Ill.

[22] Filed: Apr. 10, 1974

[21] Appl. No.: 459,655

[52] U.S. Cl. .................................. 271/124; 271/37
[51] Int. Cl.² .......................................... B65H 3/46
[58] Field of Search ............... 271/34, 37, 121, 124, 271/125

[56] References Cited
UNITED STATES PATENTS

| | | | |
|---|---|---|---|
| 1,136,960 | 4/1915 | Ielfield | 271/34 |
| 1,153,339 | 9/1915 | Rogers | 271/121 |
| 1,646,107 | 10/1927 | Pitney et al. | 271/124 |
| 2,381,853 | 8/1945 | Bombard | 271/124 |
| 2,779,593 | 1/1957 | Doerner | 271/121 |
| 3,838,851 | 10/1974 | Kolibas | 271/124 |

Primary Examiner—Robert W. Saifer
Attorney, Agent, or Firm—Pope, Ballard, Shepard & Fowle

[57] ABSTRACT

Photocopy machine having a feed module for successively feeding individual original documents from a stack thereof. Cooperating portions of the feed module and of the photocopying machine form a straight line original document feed path having an entryway that is accessible for conventional insertion of original documents. The feed module includes apparatus for successively feeding original documents from a stack along a direction reversing path that leads to the above entryway of the straight line feed path. The feed module can be pivoted to afford access to the straight line original document path and to permit copying of original documents which cannot be sheet fed. The feed module includes an original document separating arrangement wherein a feed tire and flanking retarder bars are cooperatively disposed so as to obviate need for any adjustment of the arrangement to afford proper feeding of documents of variable thickness.

14 Claims, 7 Drawing Figures

PHOTOCOPY MACHINE

BACKGROUND OF THE INVENTION

The present invention relates to the art of photocopy machines and, more particularly, to so-called desk-top copiers.

Until relatively recently, it has been necessary in performing copying operations with such copiers to manually feed each document to be copied into the machine. To eliminate this drawback, some desk-top copiers have been equipped in recent years with various automatic feed devices capable of successively feeding individual documents from a document stack into the copier without need for the presence of an operator once document feed has been initiated. Although copiers equipped with automatic original document feed devices have been well received, such copiers have heretofore been subject to a number of drawbacks.

With some copiers equipped for automatic feed of original documents, it is necessary to employ the automatic feed mechanism although only a single document is to be copied. Forced usage of the automatic feed mechanism is disadvantageous for at least two reasons. First, it often requires bothersome adjustment of the feed device so as to accommodate the single document to be copied. This usually involves adjustment of the document side guides and can involve adjustment for document thickness. Second, the feed mechanism subjects the original document to the rigors of a power feed tire or set of tires and a document reversing transport path. Where the original document is brittle with age, or where the original document is worn and frayed, but valuable, there is a natural reluctance for good reason on the part of users in subjecting the document to the rigors of the power feed mechanism. Other copiers equipped for automatic feed afford the possibility of making copies without usage of the automatic feed device. However, with such copiers the power feed unit must be removed from the copier in order to permit access to the entryway of the original document feed or transport system.

It is necessary to afford ready access to the original document transport path or paths of desk-top copiers so that original documents can be retrieved from the sheet handling apparatus in cases of document jam or machine stoppage. Heretofore, access to the original document path has been obstructed by any automatic feed device employed and has required removal thereof or substantial disassembly of the apparatus before the entire sheet handling apparatus could be rendered accessible.

As alluded to hereinabove, it has heretofore been necessary to adjust automatic original document feed devices in accordance with the thickness of the documents to be fed. With existing feed devices, such adjustment involves considerable guesswork on the part of the operator. Often, proper adjustment can be made only after having aborted several copying runs due to improper feeding.

Although desk-top copiers are available which can make copies of original documents not in sheet form, such as a book page, such versatility has heretofore been absent with copiers equipped with automatic document feed devices.

SUMMARY OF THE INVENTION

An object of the present invention is to provide a photocopy machine having the capabilities, without any apparatus adjustment or equipment removal, of automatic original document feed and manual document feed.

Another object of the invention is to provide a photocopy machine of the above character wherein access to the original document transport path can be readily had so as to facilitate retrieval of original documents therefrom and to enable copying of original documents of non-sheet form.

A more particular, but important, object of the invention is to provide improved original document feed apparatus such that the necessity for critical adjustment thereof in accordance with document thickness is eliminated.

A photocopy machine in accordance with the present invention comprises a copier unit having a document feed deck and a mating feed module mounted to open from, and close upon, the copier unit. The copier unit and module each include sheet feeding and guiding elements which, when the module is closed upon the copier unit, are disposed in opposed relationship to define a straight line original document feed path having an entryway aligned with the feed deck of the copier unit. The feed module includes apparatus for automatically separating stacked documents and facility for transporting the same to the above entryway, whereupon the separated documents are transported along the straight line document feed path in the same fashion as manually fed documents. When the feed module is opened from the copier unit, the opposed feeding and guiding elements are separated and, hence, the document feed path is exposed to facilitate retrieval of jammed or stranded documents and to enable copying of original documents of non-sheet form.

Improved apparatus for successively separating the top document from a stack of documents includes, in accordance with the present invention, a document feed tire, a pair of friction pads arranged in flanking relationship to the feed tire with the upper surfaces of the pads defining a plane that slightly intercepts the outer periphery of the tire, and a document support that defines a plane that is slightly inclined with respect to the plane of the pads and which intercepts such plane.

A better understanding of the present invention, the objects and advantages thereof, will be had with reference to the following detailed description of the presently preferred embodiment when considered in conjunction with the accompanying drawings in which:

FIG. 4 is a sectional view taken, as indicated, along the line 4—4 of FIG. 2;

DETAILED DESCRIPTION

Figure 1:
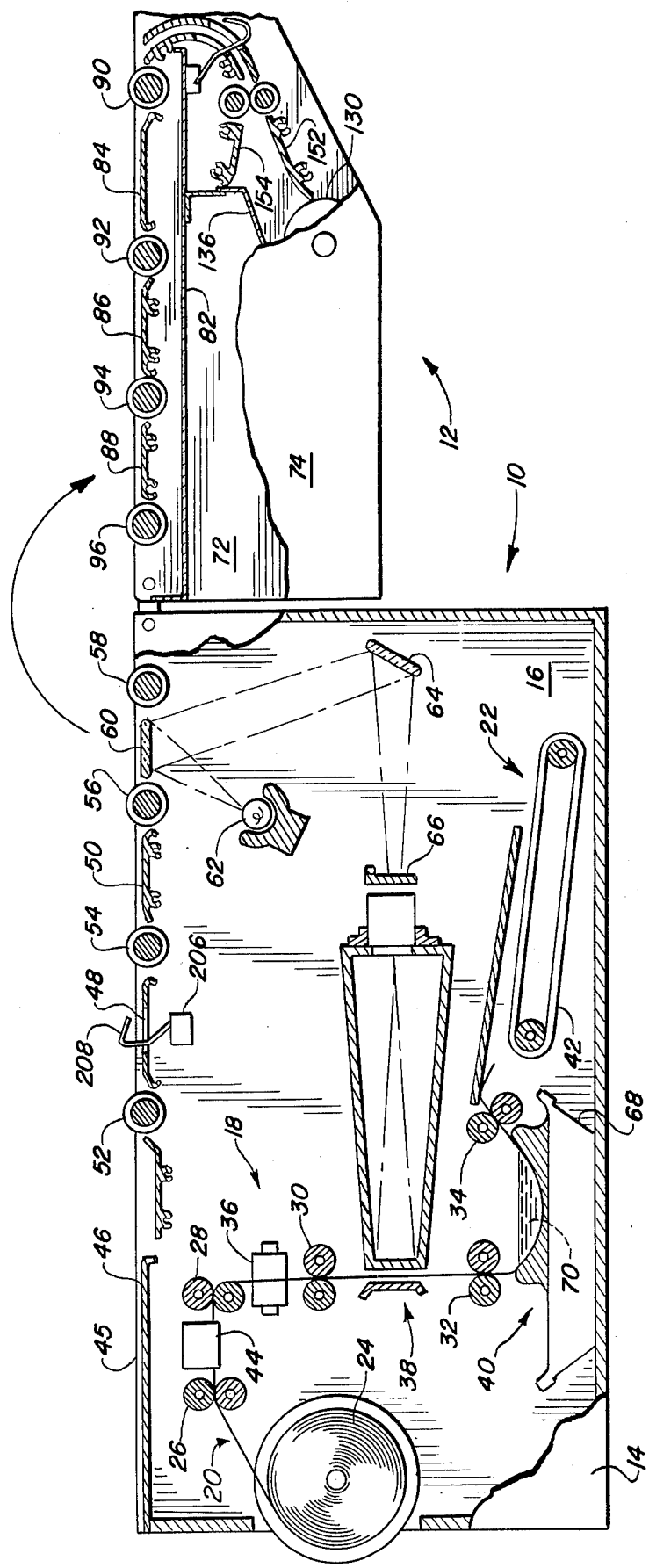
FIG. 1 is a side view with portions of the front wall structure cut away of a copier unit with the feed module in its opened position.

Referring now to the drawings, a copying machine incorporating the present invention is shown to comprise a copier unit 10 and a feed module 12 mounted upon the copier unit for movement between the closed position (FIGS. 2 and 6) and an open position (FIG. 1). For purposes of illustrative disclosure, the copier unit 10 is of the electrostatic type wherein an original document is illuminated and an image of any indicia thereon is projected through an optical system to light sensitive copy paper, the resultant latent electrostatic image then being developed by the application of toner particles to the paper in a manner well known in the art.

More particularly, the copier unit 10 illustrated herein (see FIG. 1) includes a substantially rectangular housing including side walls 14, 16. A copy paper transport system 18 is provided to transport a length of copy paper along a pathway from a copy paper input 20 to a copy paper output 22, the copy paper being stored in a roll 24 supported on a spindle. The copy paper transport system 18 is further defined by co-operating pairs of feed rollers 26, 28, 30, 32 and 34 spaced apart along the pathway and which serve to convey the copy paper past a corona discharge station 36, an image receiving station 38, a developing station 40 and, finally, to an output conveyor 42 leading to the copy paper output 22. A knife 44 is positioned in the copy paper pathway between feed roller pairs 26 and 28 to sever the copy paper to a length corresponding to that of the original document.

The top face of the copier unit 10 is constituted a feed deck 45 and by a set of transversely extending guide plates 46, 48 and 50 and feed rollers 52, 54, 56 and 58. This guide plate and feed roller set in cooperation with a corresponding set of guide plates and feed rollers of the module 12 to be described hereinafter forms an original document transport system for transporting original documents along a straight line document path to and past an illuminating station, defined by scanning window 60. As will be described hereinafter, travel of the original document along the straight line original document path is synchronized with that of the copy paper along the copy paper path. Briefly, the timed relationship is such that at the time the original document reaches the scanning window 60, a corresponding length of copy paper (severed by knife 44) has travelled past the corona discharge section 36 so as to be charged thereby and has reached the image receiving station 38. When the original document reaches the scanning window 60, it is illuminated by a high intensity exposure lamp 62. Light reflected from the original document is transmitted through an optical system, including mirror 64 and lens 66, onto the sensitized copy paper passing across the image receiving station 38. The developer station 40 includes a receptacle 68 containing toner solution 70. Feed roller pair 34 squeeze the toner back into the receptacle and transfer the copy paper on to the output conveyor 42.

The feed module 12 basically comprises a pair of complementary shaped side frame walls 72, 74 interconnected by a pair of the bars 76 and 78, a tie rod 80 and a horizontal base plate 82. Supported between the side frame walls 72, 74 and below the base plate 82 is a set of transversely extending guide plates 84, 86 and 88 and feed rollers 90, 92, 94 and 96. As stated hereinabove this guide plate and feed roller set cooperates with the guide plate and feed roller set of the copier unit 10 to define the original document transport system. As will be discussed below, the feed module 12 further includes facility for receiving a feed table or chute for supporting a stack of original documents, and a feed system, including a document separator mechanism and a transport guide system, for automatically feeding original documents successively from the feed table to the original document transport system.

Figure 2:
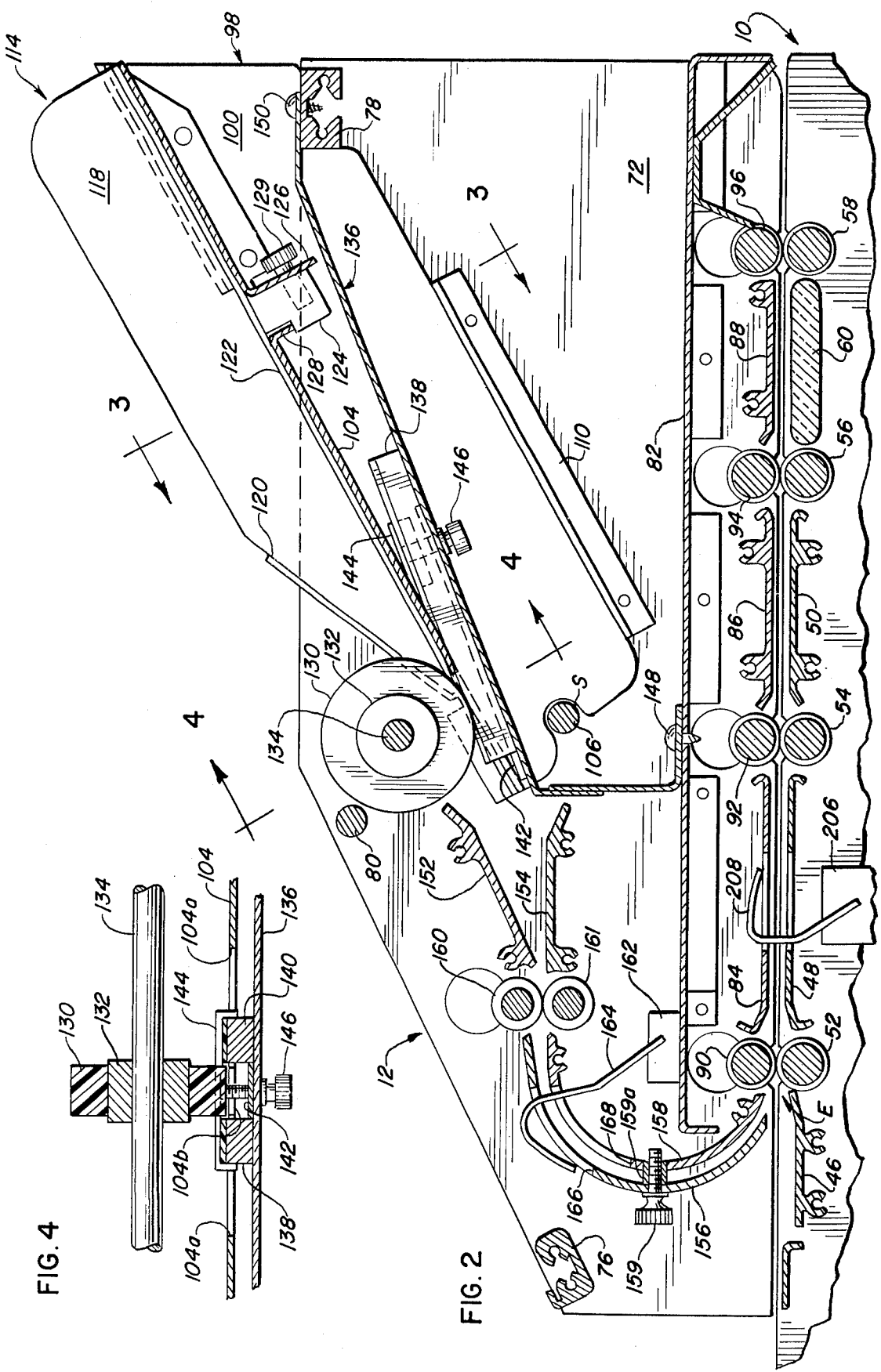
FIG. 2 is a side sectional view of the feed module in its closed position upon the copier unit.
Figure 3:
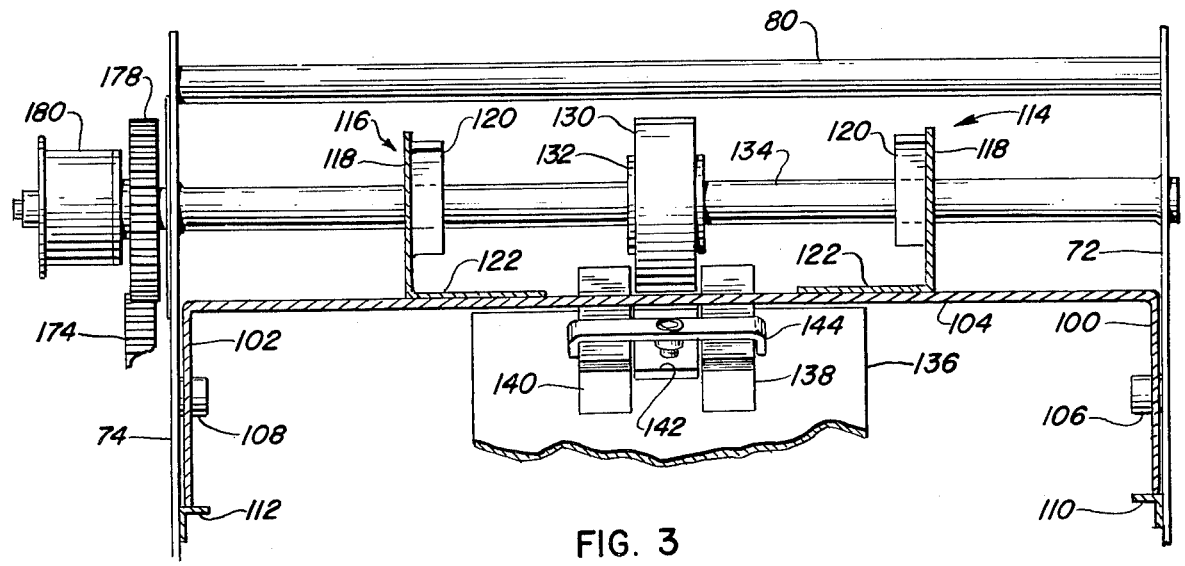
FIG. 3 is a sectional view taken, as indicated, along the line 3—3 of FIG. 2.

With reference to FIGS. 2 and 3 the feed table or chute 98 is shown in its normal inserted position within the module 12. The chute 98 comprises a unitary, generally channel shaped structure that includes a pair of complementary shaped, downwardly extending side walls 100, 102 and a top wall 104 which serves as a bottom support table for stacked original documents. The chute 98 is supported between the side frame walls 72, 74 of the module 12 by locating pins 106, 108 extending inwardly from the side frame walls and by tie bar 78, the leading edge regions of the side walls 100, 102 having arcuate cut out portions S to receive and seat upon the locating pins 106, 108 and the bottom rear edge regions of the side walls 100, 102 being shaped to seat upon tie bar 78. Elongated angle shaped guides 110, 112 attached to the inner faces of side frame walls 72, 74 facilitate insertion of the chute therebetween.

A pair of document side guides 114, 116 are mounted upon the top wall 104 of the chute. The side guides 114, 116 are generally angle-shaped in configuration, each comprising an upstanding wall 118 having an inwardly turned leading edge region 120 and an inwardly extending bottom wall 122. Provision is made for adjustable transverse movement of the side guides 114, 116 so that documents of various widths can be accommodated by the chute. To this end a transverse slot is formed in the top wall 104 of the chute through which extend sliders 124, one for each of the document side guides, which are fixed to the underside of the bottom walls 122 of the document side guides. Downwardly turned portions 126, 128 of the top wall 104 of the chute both define the above mentioned slot and define runners for the sliders. Each slider is provided a thumb screw 129 which extends through a transverse slit in wall portion 126 to enable sidewise adjustment of the document side guides.

The document separating arrangement of the document feed system includes a feed tire 130 of relatively soft, high friction rubber, supported on a wheel 132 that is fixed on rotatable shaft 134 extending between journals (not shown) supported by the side frame walls 72, 74. Completing the document separating arrangement, a mount 136 carries a pair of friction bars 138, 140 in flanking relationship with respect to the feed tire 130. Proper spacing, to be discussed hereinbelow, between the friction bars is maintained by virtue of a spacer plate 142 affixed to mount 136. A channel shaped bracket 144 and cooperating thumb screw 146 maintain the friction bars positionally upon the mount and permit adjustable movement thereof along the direction of feed (i.e. to the left or right in FIG. 2). The friction bars are disposed, as best shown in FIG. 2, such that the plane defined by the upper surfaces thereof slightly intercepts the outer periphery of the feed tire. To permit adjustment in the amount of such intercept, screws 148 and 150 extend through slots in the mount so that the entire mount can be shifted in the direction of feed. Such adjustment need only be made once.

Figure 6:
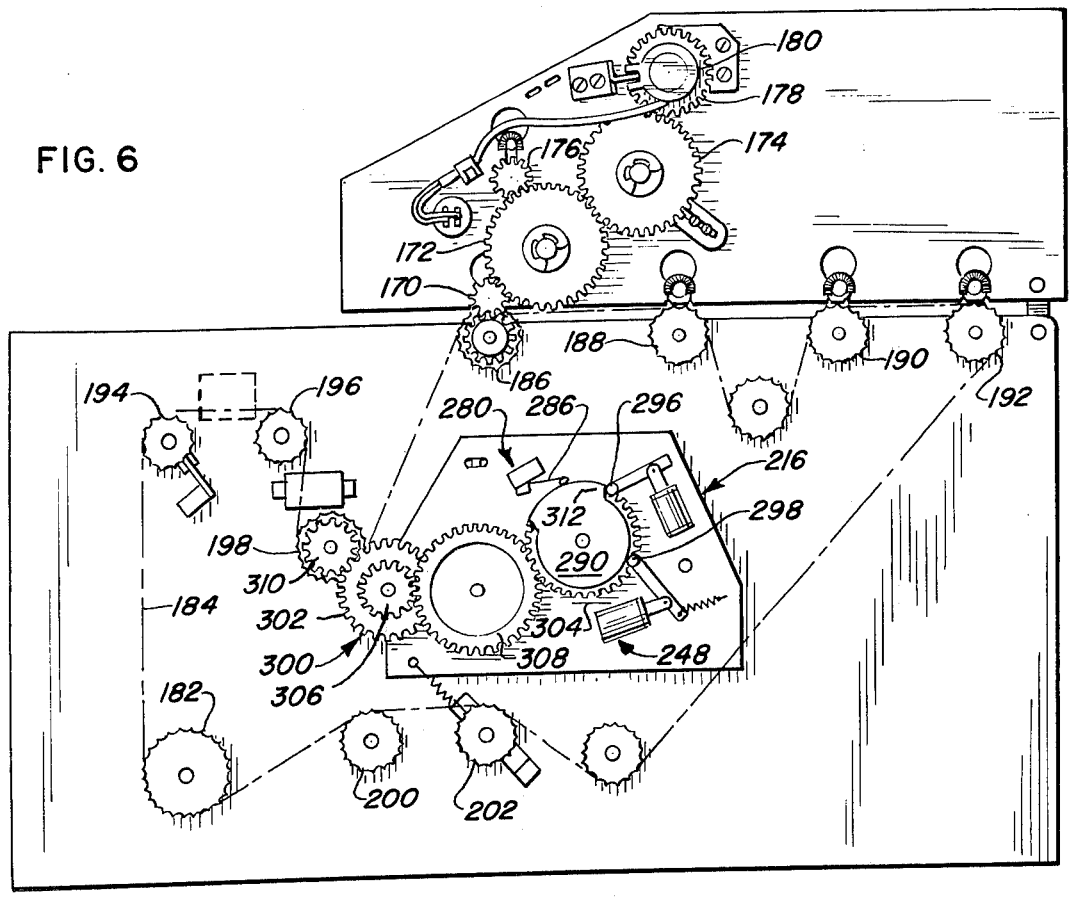
FIG. 6 is a side elevational view of the copier with the feed module in its closed position and showing details of the mechanical drive.
Figure 5:
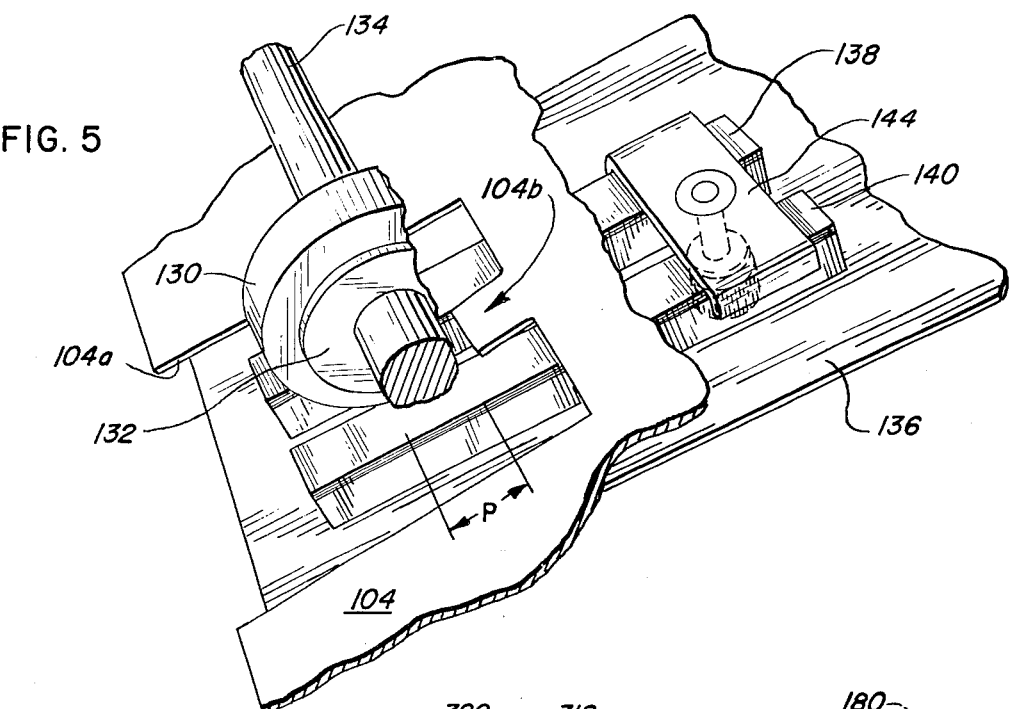
FIG. 5 is a fragmentary perspective view showing the arrangement of the feed tire, retarder bars, and hopper.

With reference to FIGS. 3, 4 and 6, it will be noted that the plane of the support table 104 of chute 98 is slightly inclined with respect to the plane defined by the flat top surfaces of bars 138 and 140 and is substantially tangent to the tire 130. It will also be noted that the forward region of the support table is cut out to define an opening 104A such that, when the chute is in place, the bars 138 and 140 can freely extend through the cut out region and above the plane of the support table 104. A tongue 104b of the support table 104 extends into the cut out region between the bars 138 and 140 to the point where the plane defined by the upper surfaces of bars 138 and 140 intercepts the plane defined by the upper surface of support table 104. This point is slightly short of the region of pinch P (See FIG. 5) between the bars 138 and 140 and feed tire 130 (i.e. the length region along bars 138 and 140 below the top surface of which the feed tire dips).

In the presently referred form illustrated herein, the feed tire 130 and wheel assembly is a conventional assembly commonly used in various feeding applications, the tire being of pure gum rubber and having a width of 1/2" and the wheel-tire assembly having a diameter of 1-9/16 inches. With particular reference to FIG. 4, a sectional view through the axis of the tire 130 and along a line normal to the plane of support table 104, the bars 138 and 140 are positioned in the illustrated embodiment to afford a penetration by the tire 130 below the upper surfaces thereof of approximately 1/32 inch and a clearance between the feed tire and each of the bars of approximately 1/16 inch. In the embodiment disclosed herein the bars are formed of aluminum with an approximately 1/16 inch thick top layer of rubber bonded thereto. The rubber constituting the upper surface of bars 138 and 140 in the embodiment illustrated herein is 70 durometer neoprene exhibiting a surface friction greater than that of paper. (It has been found that the surface friction of such rubber purchased in strip form from suppliers can vary. Whether the neoprene is suitable can quickly be determined upon pushing one's finger with gentle pressure over the surface. If the finger slides along smoothly, the rubber will not be satisfactory. If the finger bumps along the surface, the rubber will be satisfactory).

The above described feed tire and friction bar arrangement enables, as stated hereinabove, proper feeding of a stack of documents and requires no adjustment to maintain such proper feeding even though the thicknesses of documents being fed vary from that of vellum to that of relatively heavy cardstock such as punch cards and the like. The reason for this attribute can be best understood with reference to FIGS. 2 and 4. As is conventional, any stack of documents to be fed is first fanned (i.e. slanting the stack so that the leading edge of the upper of any two adjacent sheets of the stack slightly overhangs the leading edge of the lower of such adjacent sheets) and then slid into the supply chute 98. Because the stack has been fanned, the leading edges of the upper documents will be urged downwardly by the pressure of the feed tire on the upper leading edge region of the topmost sheet. Depending upon considerations such as the height of the stack and the extent to which the stack has been fanned, the leading edge of the topmost document may or may not initially be located at or near the pinch area P (see FIG. 5). Likewise, if the stack has not been perfectly fanned, the leading edge of the topmost document may not overhang or lead the leading edge of the sheet immediately therebelow. In any case, upon rotation of the feed tire 130 (clockwise direction in FIG. 2) the topmost document will be drawn in the feed direction. If the leading edge of the topmost document initially was at the pinch area P, immediately upon being drawn the upper surfaces of friction bars 138 and 140, and particularly the upper edges thereof adjacent the tire 130, will engage spaced apart localized underside regions of the sheet being drawn to maintain such regions in a plane that slightly intercepts the perimeter of the tire. Such results in a slight bending of the sheet between such spaced apart regions by the pressure of the feed tire upon the topside of the sheet, as well as pinching forces acting between the inner edge regions of the bars and the underside of the sheet and acting between the tire and topside of the sheet. The rolling coefficient of friction of the tire, being greater than that of the sliding coefficient of friction of the rubber, forming the top inner edge region of the bars 138 and 140, the sheet will continue to be drawn by rotation of the tire. If the leading edges of two sheets simultaneously reach the area of pinch P, rotation of the feed tire will draw only the upper of the two documents because the pinching forces and higher coefficient of friction of the rubber of bars 138 and 140, as compared with that of paper, almost immediately causes a condition of slide between the sheets.

It has been found that the document separating and feeding mechanism illustrated herein results in no damage to the sheets being fed. In this connection it should be noted that the feed tire, being of resilient material (pure gum rubber in the illustrated embodiment) will tend to flatten against a relatively stiff document rather than bend it enough to cause any creasing. Testing has shown that the amount of bending inflicted upon sheets of thin, flexible material is insufficient to cause permanent creasing or other damage.

Document separating and feeding mechanisms, such as that disclosed herein, have been found to be capable of several thousand successive operations on documents of variable thickness prior to a misfeed. The mechanism will begin to occasionally misfeed after the top inner edges (i.e. the neoprene) of the bars 138 and 140 wear down to the extent that insufficient pinching action is available. With the arrangement illustrated herein, when such wear has occurred; the thumb screw 146 can be loosened and the position of the bars 138 and 140 adjusted so as to present unworn top inner edge regions in the pinch area P. In this connection the disposition of the elongated bars illustrated herein need only be such as to afford edge regions in the pinch area. The choice of neoprene to serve as the edge regions was made after determining that such material exhibited excellent wear characteristics as well as suitable frictional characteristics. In similar vein the configuration of the bars 138 and 140 was selected in order to afford the ability to easily replace worn edges in the pinch area P. Fine abrasive stone would be a suitable alternative to the neoprene except that it exhibits less desirable wear characteristics.

The transport guide system of the document feed system includes a pair of receiving guides 152, 154; a pair of direction reversing guides 156, 158; and feed roller pair 160, 161, all of which extend between the side frame walls 72, 74 of the feed module 12. In order to afford access to the document reversing path, reversing guide 156 is removably secured in spaced relation to guide 158 by a pair of thumb screws 159 which are in threaded engagement with annular seats 159a fixed to guide 158. The seats 159a are located near the side frame walls 72, 74 so as not to impede the document path.

Completing the document feed system, a switch 162 mounted upon the base plate 82 of the feed module, has a wire trip arm 164 extending through aligned slits 166, 168 of reversing guides 156, 158 so as to be deflected upon passage of a document therebetween. As will be explained hereinbelow, when trip arm 164 is deflected, switch 162 acts to prevent feed tire 130 from operating to further separate documents from the document stack.

Figure 7:
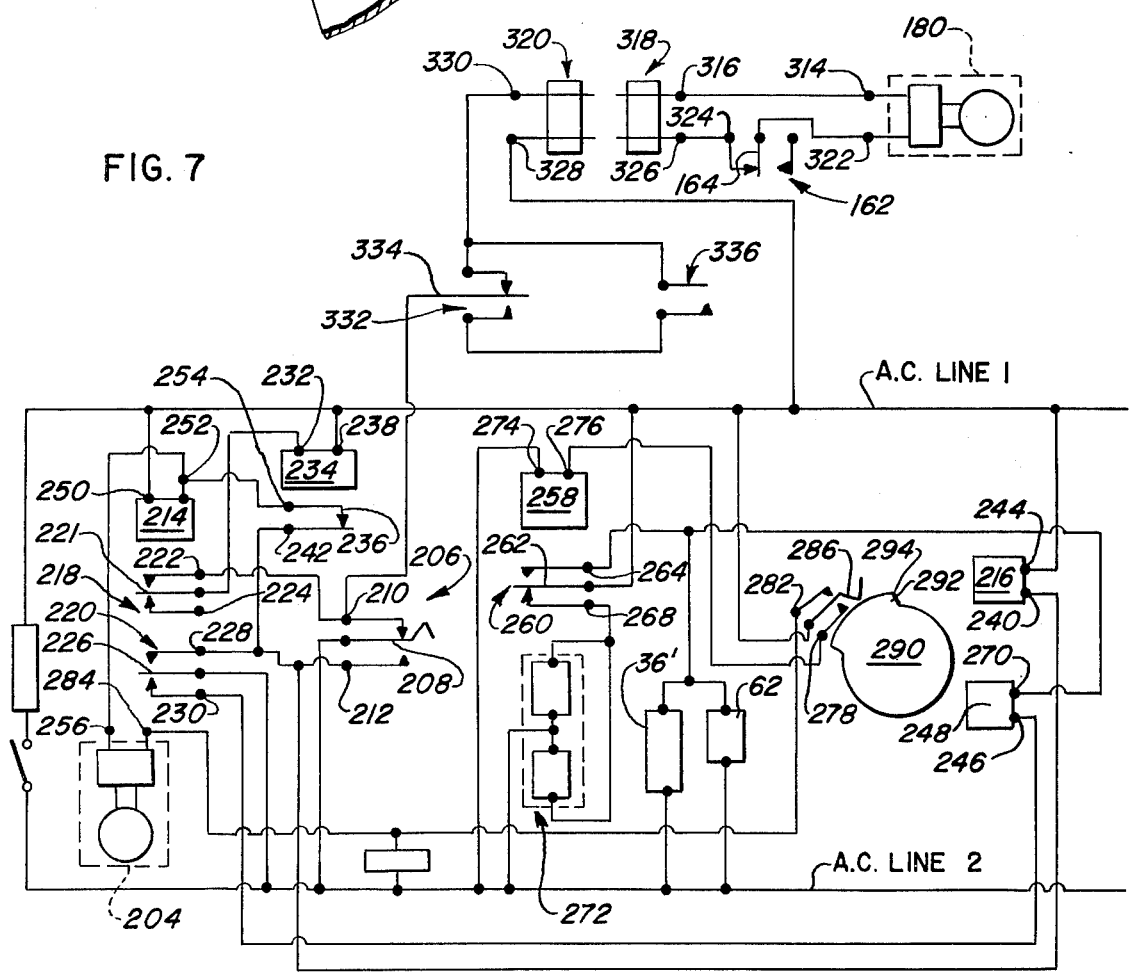
FIG. 7 is a schematic circuit diagram of the copier drive system.

Referring now particularly to FIGS. 6 and 7, the mechanical drive means for the original document transport system and the copy paper transport system will be described. A motor (not shown) drives a main sprocket 182, which in turn drives a continuous revolving drive chain 184. The rollers 52, 54, 56 and 58 of the copier unit 10 are linked to the chain 184 respectively by sprockets 186, 188, 190 and 192. Operating driving force is imparted to the document feed system of the feed module through the engagement of driven feed roller 52 of the copier unit 10 with feed roller 90 of the feed module 12. The rotary motion, imparted to roller 90, is transmitted via a gear train comprising input gear 170 (which is fixed to rotate with roller 90), idler gears 172, 174, driven gear 176 (which is fixed to rotate guide roller 161) and driven gear 178. Gear 178 is connected through an electrically operated clutch 180 such that it is connected to drivingly rotate shaft 134 when clutch 180 is engaged. One roller each of roller pairs 26, 28, 30, 32 and 34 of the copy paper transport system are similarly linked to the chain 184 respectively by sprockets 194, 196, 198, 200 and 202. The other roller of each cooperating pair is an idler roller. A copy paper clutch, indicated generally by the reference numeral 204 (FIG. 7) couples and decouples sprocket 194 from the shaft of the input drive roller of roller pair 26. When the clutch energizes, the input roller pair 26 pulls the copy paper from the roll 24 into the copy paper pathway and past the knife 44 toward the roller pair 28.

A document-switch 206 (FIG. 2) is centrally positioned between sidewalls 14, 16 of the copier unit adjacent to the input drive roller 52. Switch 206 includes a trip arm 208 and stationary terminals 210 and 212. Arm 208 is depressed by the leading edge of an original document from an original-position in contact with terminal 210 to a copy-position in contact with terminal 212. When switch 206 initially switches into the copy-position, clutch 204, a knife relay 214 and a first solenoid stop means 216 energize.

The knife relay 214 controls switches 218 and 220. Switch 218 includes a switch arm 221 and contacts 222 and 224; and switch 220 includes switch arm 226 and contacts 228 and 230. Switch arm 221 is connected to terminal 232 of a knife solenoid 234. The energizing or de-energizing of the solenoid 234 causes knife switch 236 to open and close. The other terminal 238 of knife solenoid 234 is connected to line 1 of the AC power. Contact 222 is connected to contact 210 of switch 206, and contact 224 is unconnected. Switch arm 226 is connected to line 2 of the AC power. Contact 228 is connected to contact 212 of document-switch 206, to input power terminal 240 of the first solenoid stop means 216 and a terminal 242 of knife switch 236. The other input power terminal 244 of the stop means 216 is connected to AC line 1. Contact 230 is connected to input power terminal 246 of a second solenoid stop means 248. Input power terminal 250 of knife relay 214 is connected to AC line 1 and input terminal 252 is connected to switch arm 254 of knife switch 236 and terminal 256 of copy clutch 204.

A light relay 258 includes a switch 260 having a switch arm 262 moving between contacts 264 and 268. Switch arm 262 is connected to AC line 1; contact 264 is connected to input power terminal 270 of the second solenoid stop means 248, to the corona power supply 36' and to the high intensity exposure lamp 62; and contact 268 is connected to a heater unit 272. Input power terminals 274 and 276 of relay 258 are connected respectively to AC line 2 and contact 278 of a copy-switch 280.

Contact 282 of copy-switch 280 is connected to terminal 284 of clutch 204; and switch arm 286 of copy-switch 280 is connected to AC line 1. The corona power supply 36' and exposure lamp 62 are turned "on" when switch arm 286 connects with contact 278.

A cam-switch control cooperates with the copy-switch 280 to primarily control the "on-off" of the corona and the exposure lamp. The switch control means comprises a cam 290 comprising an outward extending neck portion 292 having an arcuate outer edge. The leading side edge 294 of the cam abuts fingers 296, 298 (See FIG. 6) respectively of the first and second solenoid stop means 216 and 248 at different times of the copy cycle. The outer edge of neck portion 292 depresses the switch arm 286 of the copy-switch 280. The fingers 296, 298 respectively of solenoid stop means 216 and 248 block the cam 290 when in a de-energized condition and release the cam in an energized condition.

A gear train indicated generally by reference numeral 300 links cam 290 with the chain drive 184 (FIG. 6). Gear train 300 comprises an input gear 302, output gear 304, and intermediate gears 306 and 308. Input gear 302 meshes with chain coupling gear 310 which is fixed to the shaft of the driven roller of roller pair 30. Sprocket 198 linked with main chain 184 is also mounted on such shaft. Output gear 304 and cam 290 are mounted on a stub shaft 312. Intermediate gear 308 is linked with intermediate gear 306 and the output gear 304.

The rotational speed of cam 290 is the same as the rotational speed of the output gear 304. The speed of the output gear with respect to the speed of the chain 184 or a gear directly linked with the chain is determined by the size of the coupling gear 310, the input gear 302, the intermediate gear 306 and the output gear 304. Gear 308 functions primarily as a transmission gear.

The feed tire clutch 180 has one of its terminals 314 directly connected to a terminal 316 of a male plug 318 that is fixed to project through the underside of the feed module 12 and engage with a female socket 320 fixed to the topside of the copier unit 10. The other terminal 322 of clutch 180 is connected to switch arm 164 of switch 162. Terminal 324 of switch 162 is connected to the other terminal 326 of plug 318. Terminal 328 of female socket 320 is normally connected to AC line 1 while its other terminal 330 is connected through a low paper switch 332 to terminal 210 of switch 208.

Switch arm 334 of low paper switch 332 is operable to break the connection between terminal 210 and 330 when the supply of copy paper on roll 24 is nearly exhausted. A low paper by-pass switch 336 can be used to override low paper switch 332.

Operation of the sequential switching of the machine will be first described for the manual mode of operation. All switches in FIG. 7 are shown in their respective positions prior to inserting an original document into the machine for reproduction. When the original document is inserted, its leading edge depresses arm 208 of document-switch 206 from the original-position to the copy-position, causing the clutch 204, the knife relay 214 and the first solenoid stop means 216 to energize. The energized clutch 204 enables input roller pair 26 to pull the copy paper into the copy paper transport system.

In the energized or "on" state for knife relay 214, switch 218 provides a pathway from AC line 2 to terminal 232 of the knife solenoid 234, which becomes the sole pathway to line 2 for the knife solenoid after the document-switch 206 is switched back to its original position; and switch 220 provides a pathway from AC line 2 to terminal 252 of the knife relay 214 via knife switch 236, to maintain the knife relay 214 energized for the time interval after the document-switch 206 has returned to its original position and prior to the operation of the knife solenoid 234 of knife 44.

Prior to the release of the first solenoid stop means 216 from contact with the cam 290, the outer edge of neck portion 292 of the cam maintains switch arm 286 in connection with contact 282 of the copy-switch 280, which is its initial-position. When the first solenoid stop means 216 is energized, finger 296 is moved out of contact with cam 290. The cam now free of contact with finger 296 rotates clockwise until the leading edge 294 of neck portion 292 abuts the second finger 298 of the second solenoid stop means 248. During the cam movement between the first and second stop means 216 and 248, the neck portion 292 moves out of contact with the copy-switch 286. When this occurs, the copy-switch 280 switches into its operational-position, thereby severing the path between AC line 2 and clutch 204 and energizing the light relay 258. When the clutch is de-energized, the driven roller of roller pair 26 is decoupled from chain 184 and the copy paper is primarily pulled along the guide path by roller pair 28.

When light relay 258 is energized, relay switch 260 severs the path between the heater means 272 and AC line 2 and connects AC line 2 with the corona high voltage power supply 36', the exposure lamp 62, and terminal 270 of the second solenoid stop means 248.

When the trailing edge of the original document has moved past the document-switch 206, switch arm 208 returns to to its original position; thereby providing a current path between AC line 2 and terminal 232 of knife solenoid 234 via switch 218 of knife relay 214. This energizes the knife solenoid 234, causing a length of copy paper to be severed from the roll and the solenoid switch 236 to "break open".

When solenoid switch 236 is open, the path between terminal 252 of the knife relay 214 and AC line 2 is severed, causing the knife relay 214 to de-energize. Switch 220, in its de-energized or "off" state, severs the AC link with the first solenoid stop means 216 and provides a link between AC line 2 and terminal 246 of the second solenoid stop means 248, causing respectively the first stop means 216 to de-energize and the second stop means 248 to energize.

When the second stop means 248 is energized, finger 298 is moved out of contact with cam 290. The cam, now free of contact with finger 298, continues its clockwise rotation until contacting finger 296 of the first stop means 216. Prior to reaching finger 296, the cam switches the copy-switch 280 from the operational-position to the initial position.

When the copy-switch 280 switches back to the initial-position, light relay 258 is de-energized, thereby turning off the corona power supply 36' and the exposure lamp 62. Now the machine is in stand by awaiting another original document.

Operation for the power feed or automatic feed mode is the same as the manual mode except that the sequence is initiated by the feed tire 130 drawing the uppermost from a stack of documents located in the chute into the nip of roller pair 160, 161. When the leading edge of such document reaches the trip arm 164 of feed roller switch 162, the trip arm is depressed by the document which breaks the connection between terminal 314 of the feed tire clutch 180 and AC line 1 thereby deactivating the feed tire and preventing it from drawing another document. Travel of the previously drawn document continues under the influence of roller pair 160, 161 until such document is guided into the original document transport path and into the nip of roller pair 52, 90. The leading edge of the document depresses trip arm 208 which breaks the connection between terminal 322 of the feed tire clutch 180 and AC line 2 thereby preventing feed tire 130 from further drawing another document. When the trailing edge of the document passes trip arm 208, terminals 314 and 322 are both connected with their respective AC lines and feed tire 130 is operable to draw a subsequent document from the stack. The distance between trip arms 164 and 208 is preferably slightly less than the minimum length of original document recommended for use in order to insure that trip arm 164 is not released until trip arm 208 is depressed. This distance is 5-¼ inches in the illustrated embodiment.

With reference to FIGS. 1 and 2 it will be noted that when the feed module 12 is swung to its open condition the set of guide plates 46, 48 and 50 and feed rollers 52, 54, 56 and 58 are completely free so as to permit their utilization for the purpose of making copies of documents which are not in sheet form. To make a copy of a book page, for example, the operator need only rest the book upon the feed deck with the leading edge of the book page to be copied atop roller 52 and initiate the copy sequence. The operator, by maintaining light downward pressure on the book, allows the roller 52 to move the book toward roller 54 and ultimately to rollers 56 and 58 past the illuminating window 60 in proper timed relationship with the copy paper.

It will now be apparent that there has been provided a photocopy machine which avoids the disadvantages of prior constructions and which achieves the foregoing objects. In this connection it should be understood that, while a specific preferred embodiment has been disclosed herein, various changes and variations may readily be made without departing from the spirit and scope of the appended claims.

What is claimed is:

1. In a photocopy machine having means for supporting a stack of documents to be copied and means for successively withdrawing the topmost document from said stack and feeding the same along an original document transport path, the improvement wherein the document withdrawing means comprises rotatable means disposed for engagement with the upper surface leading edge region of said topmost document of said stack, means for rotating said rotatable means to effect travel of at least said topmost document past said rotatable means and toward said transport path, and means cooperable with said rotatable means for preventing travel toward said transport path of any but the topmost document beyond said rotatable means, the last-named means including means disposed in flanking relationship to said rotatable means to engage spaced apart underside length regions of the lowest traveling document and maintain said length regions in a common plane that intercepts the periphery of rotation of said rotatable means to cause traveling documents to be pinched between said rotatable means and the flanking means with successively increasing pinching forces as such documents enter the region of intercept by said plane with said periphery, said flanking means having a frictional characteristic greater than paper but less than that of said rotatable means whereby travel completely past said region of intercept is possible only for the topmost document entering the same, said rotatable means comprising an annular tire of resilient material, the peripheral document engaging surface of said tire in cross section defining a right-circular cylinder having a relatively smooth annular surface, said flanking means comprising a pair of bars each presenting a linearly extending shoulder defined by the merger of an upper document engaging bar surface lying in said common plane and a sidewall bar surface facing said tire in closely spaced relation thereto, the stack supporting means including a support table for supporting said stack, said table defining a plane substantially tangent to the periphery of said tire, said common plane being inclined with respect to the plane of the table and intercepting the same along a line located forward of the tangency point with respect to the direction of document travel, the shoulders extending from said line to a location beyond the tangency point with respect to the direction of document travel.

2. In a photocopy machine having means for supporting a stack of documents to be copied and means for successively withdrawing the topmost document from said stack and feeding the same along an original document transport path, the improvement wherein the document withdrawing means comprises rotatable means disposed for engagement with the upper surface leading edge region of said topmost document of said stack, means for rotating said rotatable means to effect travel of at least said topmost document past said rotatable means and toward said transport path, and means cooperable with said rotatable means for preventing travel toward said transport path of any but the topmost document beyond said rotatable means, the last-named means including means disposed in flanking relationship to said rotatable means to engage spaced apart underside length regions of the lowest traveling document and maintain said length regions in a common plane that intercepts the periphery of rotation of said rotatable means to cause traveling documents to be pinched between said rotatable means and the flanking means with successively increasing pinching forces as such documents enter the region of intercept by said plane with said periphery, said flanking means having a frictional characteristic greater than paper but less than that of said rotatable means whereby travel completely past said region of intercept is possible only for the topmost document entering the same, the distance between the rotational axis of said rotatable means and said common plane being much greater than the distance between said common plane and the periphery of rotation of said rotatable means where such distances are measured along a line normal to said common plane and passing through said axis, said rotatable means comprising an annular tire, said flanking means comprising a pair of bar-like structures each having a linearly extending shoulder portion defined by the merger of an upper bar document engaging surface extending in said common plane and a sidewall bar surface extending in the document travel direction in closely spaced relation to said tire, the stack supporting means including a support table for supporting said stack, said table defining a plane substantially tangent to said tire and inclined with respect to horizontal, said common plane being less inclined with respect to horizontal than the plane of the table and intercepting such along a line parallel to the rotation axis of said tire, said line being located forward of the tangency point with respect to the direction of document travel.

3. In a photocopy machine in accordance with claim 2 wherein the shoulders extend in side-by-side relation to the tire in the direction of document travel at least to said line normal to said common plane.

4. In a photocopy machine in accordance with claim 2 wherein the shoulders extend in the direction of document travel from said line parallel to the rotation axis of said tire to a location beyond engagement by said tire and the topmost document.

5. In a photocopy machine having means for supporting a stack of documents to be copied and means for successively withdrawing the topmost document from said stack and feeding the same along an original document transport path, the improvement wherein the document withdrawing means comprises rotatable means disposed for engagement with the upper surface leading edge region of said topmost document of said stack, means for rotating said rotatable means to effect travel of at least said topmost document past said rotatable means and toward said transport path, and means cooperable with said rotatable means for preventing travel toward said transport path of any but the topmost document beyond said rotatable means, the last-named means including means disposed in flanking relationship to said rotatable means to engage spaced apart underside length regions of the lowest traveling document and maintain said length regions in a common plane that intercepts the periphery of rotation of said rotatable means to cause traveling documents to be pinched between said rotatable means and the flanking means with successively increasing pinching forces as such documents enter the region of intercept by said plane with said periphery, said flanking means having a frictional characteristic greater than paper but less than that of said rotatable means whereby travel completely past said region of intercept is possible only for the topmost document entering the same, said common plane being inclined with respect to horizontal so as to define a descending document feed path in said region of intercept.

6. In a photocopy machine having means for supporting a stack of documents to be copied and means for successively withdrawing the topmost document from said stack and feeding the same along an original document transport path, the improvement wherein the document withdrawing means comprises rotatable means disposed for engagement with the upper surface leading edge region of said topmost document of said stack, means for rotating said rotatable means to effect travel of at least said topmost document past said rotatable means and toward said transport path, and means cooperable with said rotatable means for preventing travel toward said transport path of any but the topmost document beyond said rotatable means, the last-named means including means disposed in flanking relationship to said rotatable means to engage spaced apart underside length regions of the lowest traveling document and maintain said length regions in a common plane that intercepts the periphery of rotation of said rotatable means to cause traveling documents to be pinched between said rotatable means and the flanking means with successively increasing pinching forces as such documents enter the region of intercept by said plane with said periphery, said flanking means having a frictional characteristic greater than paper but less than that of said rotatable means whereby travel completely past said region of intercept is possible only for the topmost document entering the same, the stack supporting means including means for slidably supporting said stack in an inclined relationship with respect to horizontal with the leading edge regions of the documents lower than the trailing edge regions thereof, said common plane being inclined with respect to horizontal so as to define a descending document feed path in said region of intercept.

7. In a photocopy machine having means for supporting a stack of documents to be copied and means for successively withdrawing the topmost document from said stack and feeding the same along an original document transport path, the improvement wherein the document withdrawing means comprises rotatable means disposed for engagement with the upper surface leading edge region of said topmost document of said stack, means for rotating said rotatable means to effect travel of at least said topmost document past said rotatable means and toward said transport path, and means cooperable wth said rotatable means for preventing travel toward said transport path of any but the topmost document beyond said rotatable means, the last-named means including means disposed inflanking relationship to said rotatable means to engage spaced apart underside length regions of the lowest traveling document and maintain said length regions in a common plane that intercepts the periphery of rotation of said rotatable means to cause traveling documents to be pinched between said rotatable means and the flanking means with successively increasing pinching forces as such documents enter the region of intercept by said plane with said periphery, said flanking means having a frictional characteristic greater than paper but less than that of said rotatable means whereby travel completely past said region of intercept is possible only for the topmost document entering the same, the stack supporting means including means for guiding the leading edge regions of the documents downwardly along a guide plane inclined with respect to horizontal, said common plane being inclined with respect to horizontal, said guide plane and said common plane intercepting along a line parallel to the axis of rotation of said rotatable means, said line being located forward of said region of intercept with respect to the direction of document travel.

8. In a photocopy machine in accordance with claim 2 wherein said guide plane is substantially tangent to the periphery of said rotatable means.

9. In a photocopy machine having means for supporting a stack of documents to be copied and means for successively withdrawing the topmost document from said stack and feeding the same along an original document transport path, the improvement wherein the document withdrawing means comprises rotatable means disposed for engagement with the upper surface leading edge region of said topmost document of said stack, means for rotating said rotatable means to effect travel of at least said topmost document past said rotatable means and toward said transport path, and means cooperable with said rotatable means for preventing travel toward said transport path of any but the topmost document beyond said rotatable means, the last-named means including means disposed in flanking relationship to said rotatable means to engage spaced apart underside length regions of the lowest traveling document and maintain said length regions in a common plane that intercepts the periphery of rotation of said rotatable means to cause traveling documents to be pinched between said rotatable means and the flanking means with successively increasing pinching forces as such documents enter the region of intercept by said plane with said periphery, said flanking means having a frictional characteristic greater than paper but less than that of said rotatable means whereby travel completely past said region of intercept is possible only for the topmost document entering the same, the stack supporting means including a support table for supporting said stack, said table defining a plane, said common plane being inclined with respect to the plane of the table and intercepting the same along a line located forward of said region of intercept with respect to the direction of document travel, the flanking means being engageable with said underside length regions from said line at least to a point in said region of intercept defined by a line extending normal to said common plane and through the axis of rotation of said rotatable means.

10. In a photocopy machine in accordance with claim 9 wherein said guide plane is substantially tangent to the periphery of said rotatable means.

11. In a photocopy machine in accordance with claim 10 where said table includes cut out regions for accommodating said flanking means.

12. In a photocopy machine having means for supporting a stack of documents to be copied and means for successively withdrawing the topmost document from said stack and feeding the same along an original document transport path, the improvement wherein the document withdrawing means comprises rotatable means disposed for engagement with the upper surface leading edge region of said topmost document of said stack, means for rotating said rotatable means to effect travel of at least said topmost document past said rotatable means and toward said transport path, and means cooperable with said rotatable means for preventing travel toward said transport path of any but the topmost document beyond said rotatable means, the last-named means including means disposed in flanking relationship to said rotatable means to engage spaced apart underside length regions of the lowest traveling document and maintain said length regions in a common plane that intercepts the periphery of rotation of said rotatable means to cause traveling documents to be pinched between said rotatable means and the flanking means with successively increasing pinching forces as such documents enter the region of intercept by said plane with said periphery, said flanking means having a frictional characteristic greater than paper but less than that of said rotatable means whereby travel completely past said region of intercept is possible only for the topmost document entering the same, said flanking means comprising a pair of bars each presenting a linearly extending shoulder defined by the merger of an upper document engaging bar surface lying in said common plane and sidewall bar surface facing said rotatable means in closely spaced relation thereto, said last-named means including means adjustably supporting said bars whereby the shoulder of each bar can be shifted relative to said rotatable means along a path defined by the linear extent thereof.

13. In a photocopy machine having means for supporting a stack of documents to be copied and means for successively withdrawing the topmost document from said stack and feeding the same along an original document transport path, the improvement wherein the document withdrawing means comprises rotatable means disposed for engagement with the upper surface leading edge region of said topmost document of said stack, means for rotating said rotatable means to effect travel of at least said topmost document past said rotatable means and toward said transport path, and means cooperable with said rotatable means for preventing travel toward said transport path of any but the topmost document beyond said rotatable means, the last-named means including means disposed in flanking relationship to said rotatable means to engage spaced apart underside length regions of the lowest traveling document and maintain said length regions in a common plane that intercepts the periphery of rotation of said rotatable means to cause traveling documents to be pinched between said rotatable means and the flanking means with successively increasing pinching forces as such documents enter the region of intercept by said plane with said periphery, said flanking means having a frictional characteristic greater than paper but less than that of said rotatable means whereby travel completely past said region of intercept is possible only for the topmost document entering the same, the stack supporting means including guide means for guiding the leading edge regions of the documents along a plane substantially tangent to the periphery of rotation of said rotatable means, said common plane being inclined with respect to the plane of said guide means and intercepting the same along a line located forward of the tangency point with respect to the direction of document travel.

14. In a photocopy machine having means for supporting a stack of documents to be copied and means for successively withdrawing the topmost document from said stack and feeding the same along an original document transport path, the improvement wherein the document withdrawing means comprises rotatable means disposed for engagement with the upper surface leading edge region of said topmost document of said stack, means for rotating said rotatable means to effect travel of at least said topmost document past said rotatable means and toward said transport path, and means cooperable with said rotatable means for preventing travel toward said transport path of any but the topmost document beyond said rotatable means, the last-named means including means disposed in flanking relationship to said rotatable means to engage spaced apart underside length regions of the lowest traveling document and maintain said length regions in a common plane that intercepts the periphery of rotation of said rotatable means to cause traveling documents to be pinched between said rotatable means and the flanking means with successively increasing pinching forces as such documents enter the region of intercept by said plane with said periphery, said flanking means having a frictional characteristic greater than paper but less than that of said rotatable means whereby travel completely past said region of intercept is possible only for the topmost document entering the same, said rotatable means comprising an annular tire of resilient material, the peripheral document engaging surface of said tire in cross section defining a right-circular cylinder, said flanking means comprising a pair of bars each presenting a linearly extending shoulder defined by the merger of an upper document engaging bar surface lying in said common plane and a sidewall bar surface facing said tire in closely spaced relation thereto, the stack supporting means including guide means for guiding the leading edge regions of the documents along a plane substantially tangent to the periphery of said tire, said common plane being inclined with respect to the plane of said guide means and intercepting the same along a line located forward of the tangency point with respect to the direction of document travel, the shoulders extending from said line to a location beyond the tangency point with respect to the direction of document travel.

* * * * *